US008322648B2

(12) United States Patent
Kroetsch et al.

(10) Patent No.: US 8,322,648 B2
(45) Date of Patent: Dec. 4, 2012

(54) HOVERING AERIAL VEHICLE WITH REMOVABLE ROTOR ARM ASSEMBLIES

(75) Inventors: David Kroetsch, Kitchener (CA); Mike Peasgood, Waterloo (CA); Dale Brubacher-Cressman, New Hamburg (CA); Cristian Cherler, Kitchener (CA); Stephen Marchetti, Gatineau (CA)

(73) Assignee: Aeryon Labs Inc., Waterloo (CA)

( * ) Notice: Subject to any disclaimer, the term of this patent is extended or adjusted under 35 U.S.C. 154(b) by 389 days.

(21) Appl. No.: 12/465,912

(22) Filed: May 14, 2009

(65) Prior Publication Data

US 2009/0283629 A1    Nov. 19, 2009

Related U.S. Application Data

(60) Provisional application No. 61/127,638, filed on May 15, 2008.

(51) Int. Cl.
*B64C 27/08* (2006.01)
(52) U.S. Cl. .................................................. 244/17.23
(58) Field of Classification Search ............... 244/17.23, 244/17.25
See application file for complete search history.

(56) References Cited

U.S. PATENT DOCUMENTS

| 6,030,177 | A  | * | 2/2000  | Hager ........................... 416/87 |
| 6,260,796 | B1 | * | 7/2001  | Klingensmith ............. 244/23 R |
| 2006/0192047 | A1 | * | 8/2006  | Goossen ..................... 244/17.23 |
| 2006/0226281 | A1 | * | 10/2006 | Walton ........................ 244/17.23 |
| 2008/0048065 | A1 | * | 2/2008  | Kuntz ......................... 244/17.23 |

OTHER PUBLICATIONS

Starmac Quadrotor Helicopter UAV Project, The Standford Testbed of Autonomous Rotorcraft for Multi-Agent Control, uploaded to YouTube by gabehoffmann at http://www.youtube.com/watch?v=rJ9r2orcaYo on Jul. 2, 2008, 4 minutes, 49 seconds long.
Hovering Drone, uploaded to YouTube by camdrone at http://www.youtube.com/watch? v=OLI_TbPgDcc&feature=related on Aug. 13, 2006, 48 seconds long.

* cited by examiner

*Primary Examiner* — Tien Dinh
*Assistant Examiner* — Keith L Dixon
(74) *Attorney, Agent, or Firm* — DiBerardino McGovern IP Group LLC

(57) ABSTRACT

The invention provides a hovering aerial vehicle with removable rotor arms and protective shrouds. Removing the shrouds reduces the weight of the vehicle and increases flight time. Removing the rotor arms makes the vehicle easier to transport. Removable rotor arms also simplify field repair or replacement of damaged parts.

26 Claims, 5 Drawing Sheets

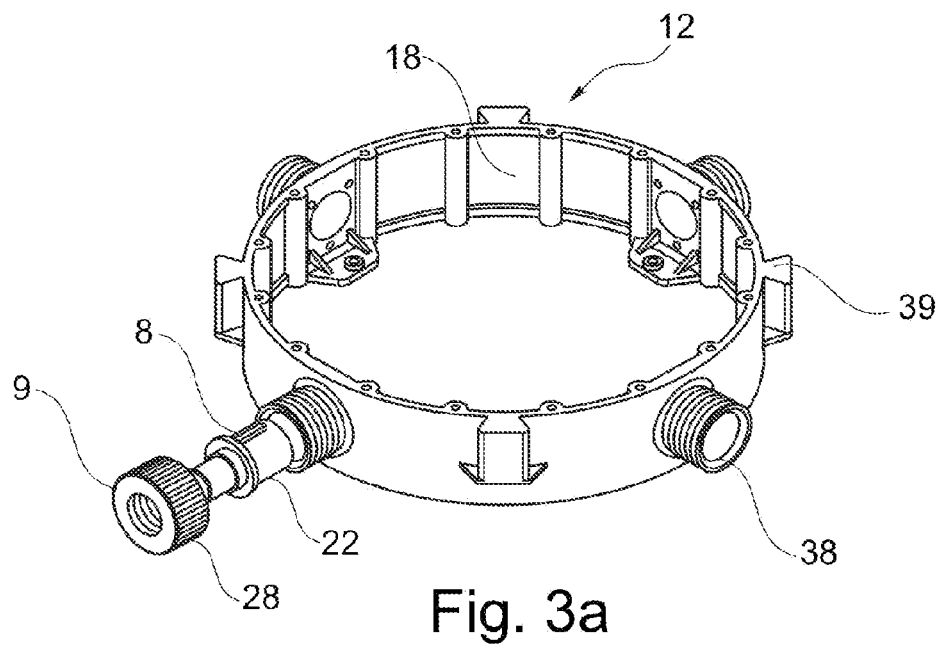
Fig. 3a
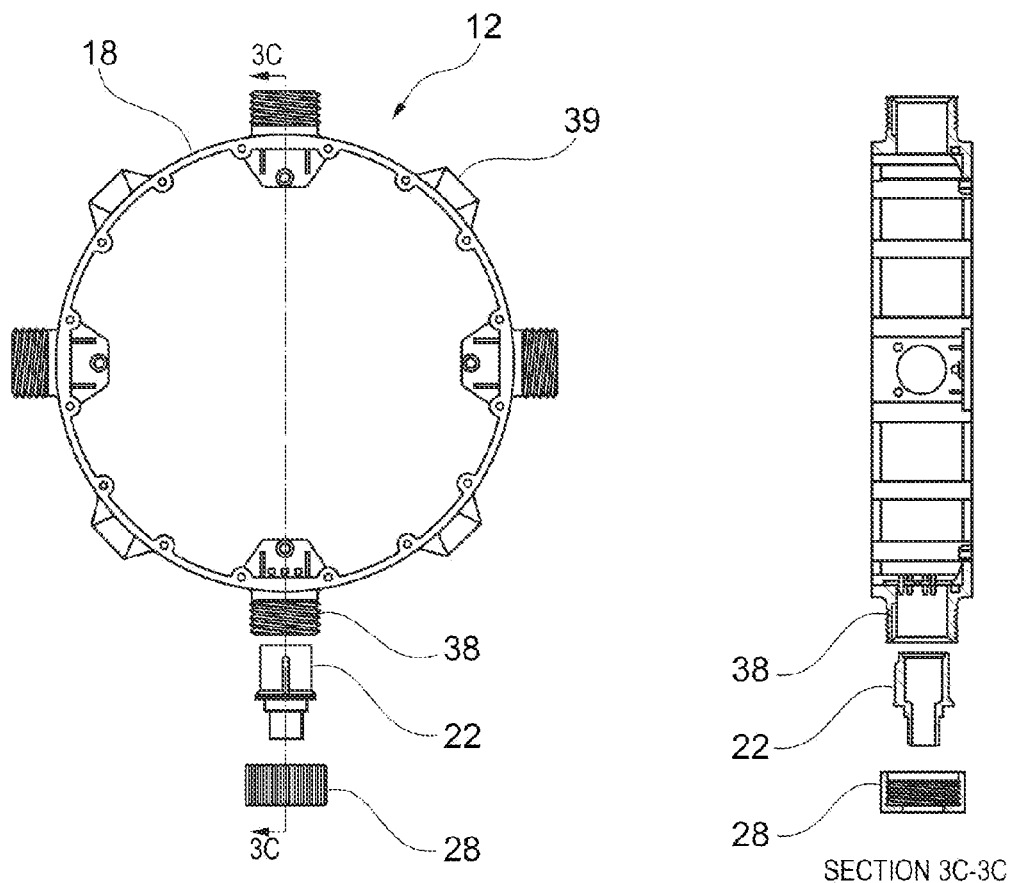
Fig. 3b
Fig. 3c

HOVERING AERIAL VEHICLE WITH REMOVABLE ROTOR ARM ASSEMBLIES

CROSS REFERENCE TO RELATED APPLICATIONS

This application claims the benefit of priority of U.S. Provisional Patent Application No. 61/127,638 filed May 15, 2008 which is incorporated herein by reference in its entirety.

FIELD OF INVENTION

The present invention relates generally to hovering aerial vehicles. More particularly, the present invention relates to an aerial vehicle with removable rotor arms.

BACKGROUND OF THE INVENTION

Remote controlled drones with camera capability have been known for many years. These drones are used to provide visual reconnaissance for areas which are typically inaccessible by humans. These types of drones include a hovering aerial vehicle which is lifted and controlled by independently driven rotors or propellers. By varying the thrust generated by each of the rotors, the orientation and speed of the vehicle can be controlled. Various designs have been proposed for such an aerial vehicle, the primary requirement of which is to rigidly mount the rotors at fixed distances from the center of the craft, while minimizing the weight of the structure.

Use of a hovering aerial vehicle is especially effective for providing digital imagery or real-time digital video from aerial vantage points. For instance, first responders to a natural disaster or train derailment can benefit from this aerial vantage point to help determine the imminent danger of the situation. Alternatively, a hovering aerial vehicle can also be used as a security measure to provide a mobile, airborne security system.

In use, these aerial vehicles are typically controlled by a remote control, however, as will be understood, there may be hidden obstacles which can damage the vehicle while in flight. As it is quite expensive to replace one of these vehicles, it is necessary to provide protection to the vehicle.

It is, therefore, desirable to provide a hovering aerial vehicle with removable rotor arms.

SUMMARY OF THE INVENTION

The invention provides a hovering aerial vehicle with removable rotor arms. In another embodiment, the aerial vehicle has protective shrouds. The aerial vehicle includes a central pod from which a set of rotor arm assemblies extend. Each of the rotor arm assemblies includes a rotor which provides the necessary thrust to propel the vehicle in desired directions. Surrounding the rotor assemblies is at least one shroud which provides protection for when the vehicle collides with an obstacle. The protection may be provided by a single shroud surrounding each of the rotor arm assemblies or each rotor assembly may be associated with an individual protective shroud.

In a first aspect, the present invention provides a hovering aerial vehicle comprising a central pod; a set of rotor arm assemblies, each of the set of rotor arm assemblies connected to and extending from the central pod; and a set of shrouds for protecting the set of rotor arm assemblies.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIG. 1b is a side view of the vehicle of FIG. 1a;

FIGS. 3a, 3b and 3c are oblique, top and section views of the frame of the central pod of the hovering aerial vehicle of FIG. 1a;

FIG. 6b is an enlarged view of the circle of FIG. 6a; and

DETAILED DESCRIPTION

Figure 1A:
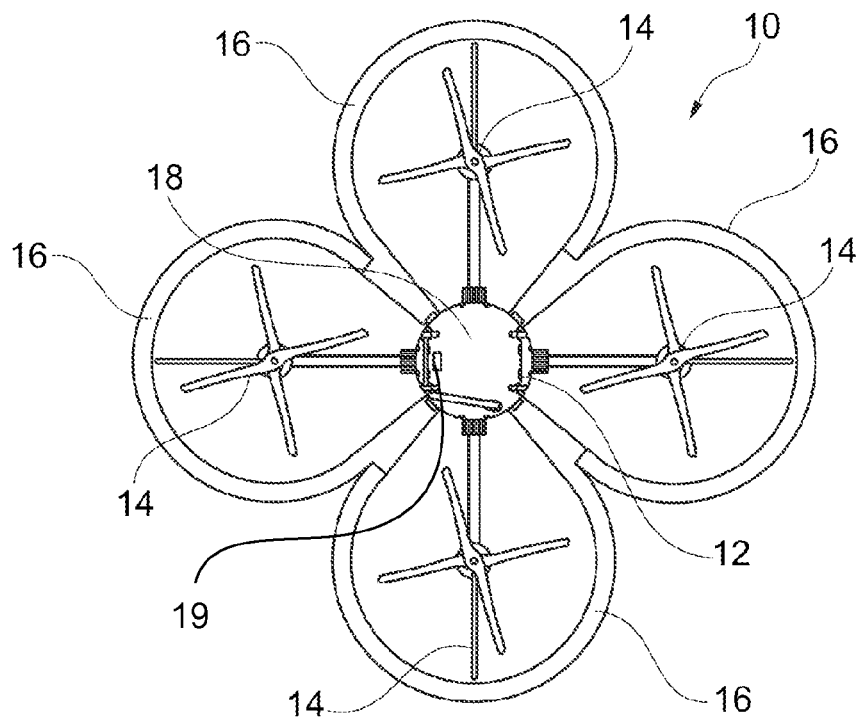
FIG. 1a is a top view of an embodiment of the hovering aerial vehicle.
Figure 1B:
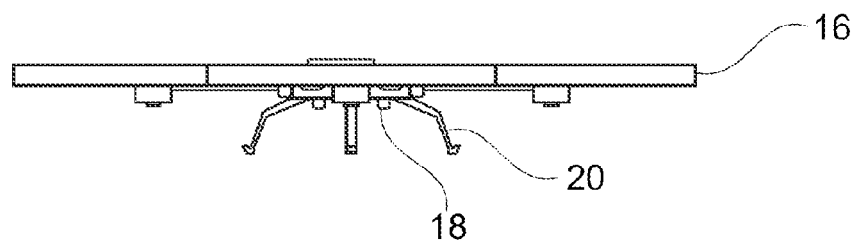
Figure 2:
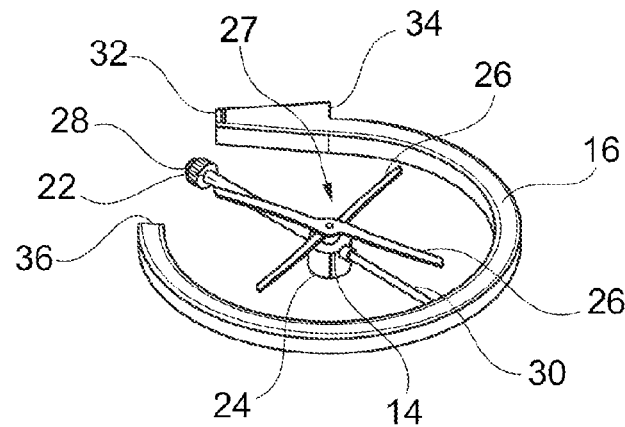
FIG. 2 is an oblique view of an individual rotor arm assembly of FIG. 1a with a shroud segment attached.

The present invention provides a novel hovering aerial vehicle. Turning to FIGS. 1a and 1b, a top view and a side view of the aerial vehicle are shown, respectively. The aerial vehicle 10 includes a central pod 12 to which a set of rotor arm assemblies 14 are connected. Along with this physical connection, there is an electrical connection between each rotor arm assembly 14 and the central pod 12 to provide power, control and communications capabilities therebetween. Surrounding each of the set of rotor arm assemblies 14 is a protective shroud 16. In the current embodiment, there is an individual shroud 16 for each of the rotor arm assemblies 14. A schematic diagram of a rotor arm assembly 14 and protective shroud 16 is shown in FIG. 2 which will be described in more detail below. The central pod 12 provides control, communications and data acquisition capabilities of the main processor 19 and mechanical support structure such as frame 18 for itself and the rotor arm assemblies 14. The aerial vehicle 10 can also include a camera (FIG. 5, camera 86) for collecting digital imagery or video. The aerial vehicle 10 also comprises a landing gear apparatus 20, including four legs 15, as shown in FIG. 1b, which can be attached either to the central pod 12, to at least one of the rotor arm assemblies 14 or to the central pod 12 and at least one of the rotor arm assemblies 14. The landing gear apparatus 20 can also be designed to easily snap into place so that it is easily replaceable. The main processor 19 is located within the frame 18 and pod 12 for receiving instructions from a remote control (not shown) which is controlled by a user to determine the direction and height at which the aerial vehicle should travel. The processor 19 can be attached to the top, bottom or sides of the frame 18 but is preferably suspended near a center of the frame to minimize the effect of mechanical vibration on the processor during operation.

Figure 4:
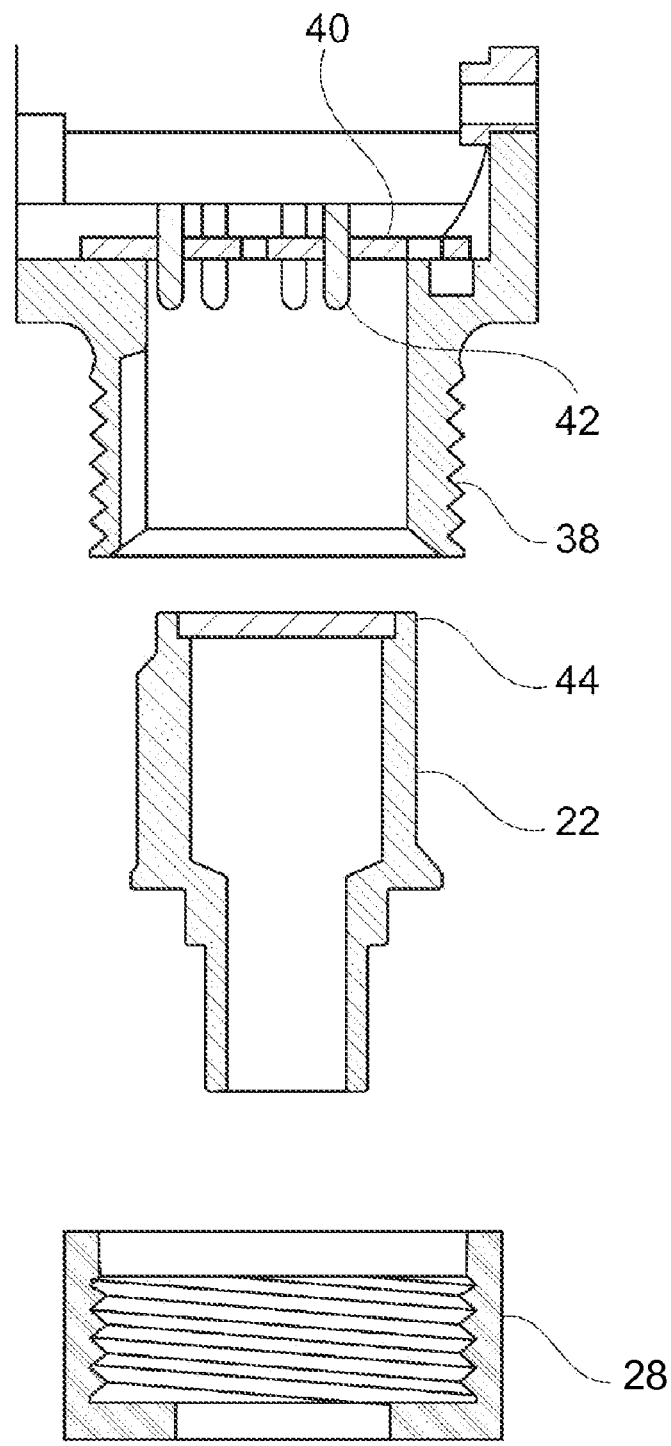
FIG. 4 is an exploded view of the connection mechanism between the central pod frame and the rotor arm of FIGS. 3a-c.

In one embodiment, as in FIGS. 3 and 4, the vehicle 10 includes a mechanism to enable each of the rotor arms 14 to be independently and easily detached from the frame 18 in the field. This allows, among other advantages, for convenient storage and transport of the vehicle 10, rapid assembly of the aerial vehicle 10 in the field, or a convenient system for replacing worn or broken components.

Turning to FIG. 2, each rotor arm assembly 14 includes a rotor arm 22 which is connected at one end to a motor basket 24. Within the motor basket 24 is a motor atop which a set of rotor blades 26 (forming part of a rotor 27) are mounted. As will be described below, the individual rotor arm assemblies 14 receive instructions from the main processor 19 to determine the rate of rotation for the set of rotor blades 26. Near the other end of the rotor arm 22 is a retainer ring 28, preferably threaded, for attachment with a corresponding threaded receptacle 38 (FIG. 4) on frame 18 to secure the rotor arm assembly 14 by rotor arm 22 to frame 18 and to the central pod 12. The ring 28 is tightened on to the receptacle 38.

Surrounding the rotor arm assembly 14 is the shroud 16 which provides protection to the rotor arm assembly 14 during operation of the vehicle 10. A support rod, or bar, 30 is connected between the motor basket 24 and the shroud 16 to provide further support to the overall vehicle 10. Each shroud 16 includes an interconnect feature, seen as a male protrusion portion, 32 for attachment to, or mating with, a corresponding interconnect feature, seen as a female receiving portion, 39 (as seen in FIG. 3a or 3b) on the frame 18. A pair of additional shroud interconnect features 34 and 36 are also located on opposite ends of the shroud 16, which is preferably circular, for connecting the shroud, or shroud segment, to an adjacent shroud (as schematically shown in FIG. 2). In an alternative embodiment, individual circular rings can be used as the shrouds. These rings can be constructed of a strong, lightweight material like carbon fiber and can be fastened to the frame 18, the arms 22 or to each other for support. In an alternative embodiment, a one-piece shroud is used to enclose all of the rotor arm assemblies 14 and therefore interconnect features 34 and 36 can be omitted.

An advantage of the present invention is that the protective shroud or shrouds 16 are attached to the rotor arm assemblies 14 to protect the individual rotor 27 and rotating blades 26 from contacting objects which can damage the vehicle. Furthermore, the shroud 16 can also shield the user, or operator from being struck by the rotating blades 26 during use.

Turning to FIG. 3a, a perspective view of the central pod is shown. The central pod 12 includes a set of threaded receptacles 38 located on the pod frame 18. A truncated portion of the rotor arm 22 is shown in FIGS. 3a, 3b and 3c and each is uniquely keyed as at 8 to incorporate a physical shape and features to complement the shape and features of the threaded receptacle 38 so that the arm 22 can only be inserted in a specific orientation. After the arm 22 is inserted into its associated receptacle 38, the retainer ring 28 is then threaded onto the receptacle 38 to secure the rotor arm assembly 14 to the central pod frame 18. This connection is further enhanced or supported by the connection between the interconnect features 32 (FIG. 2) and 39 (FIG. 3a).

FIG. 3b is a top view of the central pod while FIG. 3c is a cross-sectional view taken along line 3c-3c of FIG. 3b.

FIG. 4 is an exploded view of the receptacle 38, the truncated rotor arm 22 and the retaining ring 28. The central pod 12 includes a central pod rotor arm interface circuit board 40 which includes a set of spring-loaded pins 42 which assist in providing a secure, reliable electrical connection to a rotor arm circuit board 44 (located at an end of the rotor arm 22) for passing power, control signals and information between the rotor arm assembly 14 and the central pod 12. The spring-loaded pins 42 can also be used to communicate with sensors or other devices located on the rotor arms, such as, but not limited to range or proximity sensors or cameras, etc. (not shown) Alternatively, the information and control signals can be transmitted wirelessly.

Figure 5:
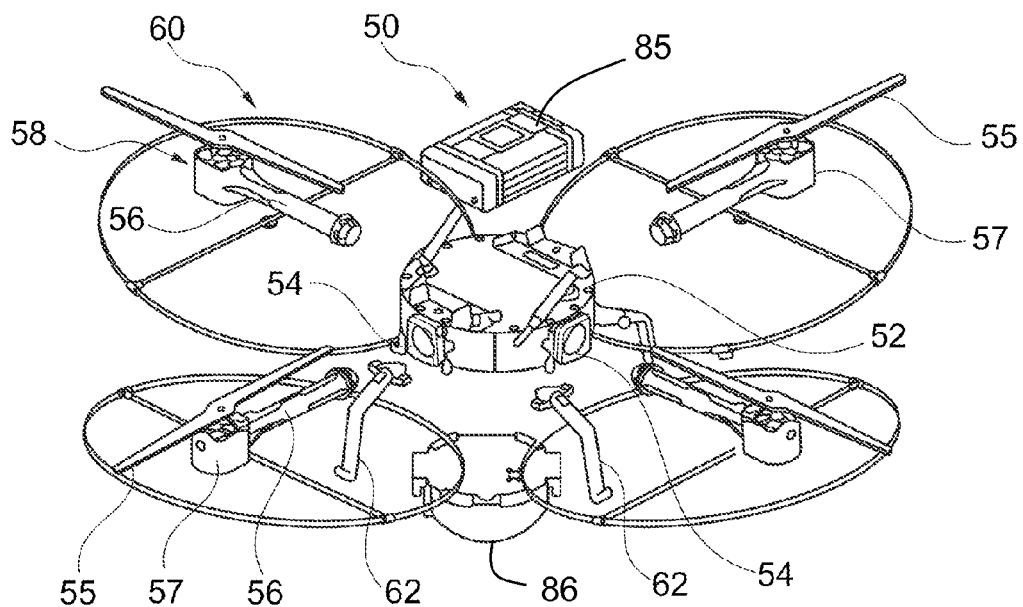
FIG. 5 is an exploded view of a second embodiment of the hovering aerial vehicle.
Figure 6A:
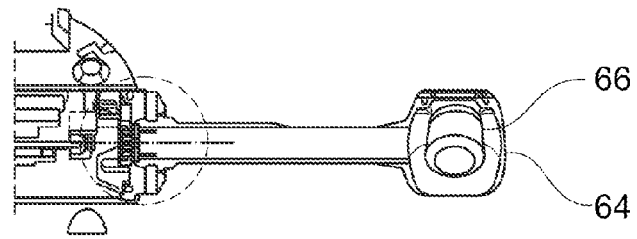
FIG. 6a is a side view of a rotor arm assembly connected to the vehicle frame of FIG. 5.
Figure 6B:
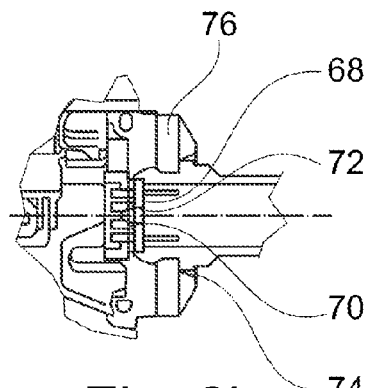
Figure 7:
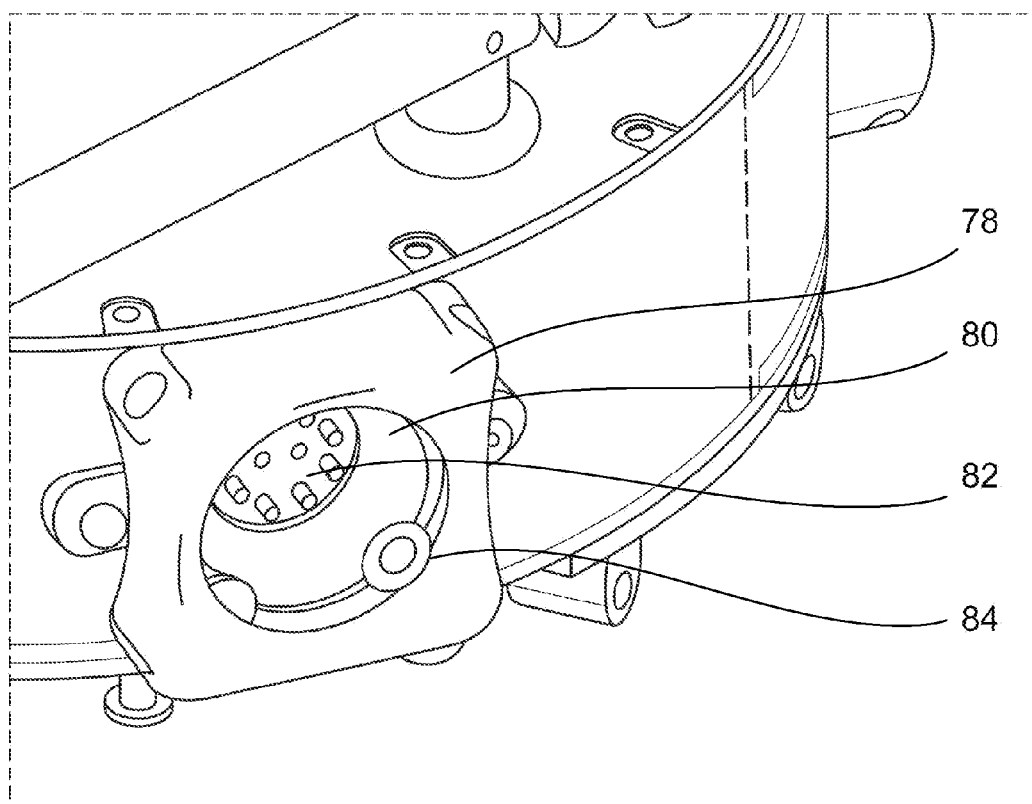
FIG. 7 is a perspective view of a hemispherical socket portion.

In another embodiment, the rotor arm assemblies can be connected via a spring-loaded snap-in mechanism as shown in FIGS. 5 to 7 (as will be described below). This allows the arms to be attached easily and allows the arms to snap off without breaking in the case of impact.

Turning to FIGS. 5 to 7, schematic diagrams of a second embodiment of an the hovering aerial vehicle is shown. The hovering aerial vehicle 50 includes many of the same parts as described with respect to the embodiment of FIG. 1 but with different rotor arm assemblies. In this embodiment, the rotor arm assemblies are shown as snap-in assemblies. As shown in the exploded view of FIG. 5, the aerial vehicle 50 includes a central pod 52 which includes a set of sockets 54 for receiving individual rotor arms 56 belonging to rotor arm assemblies 58. Each of the rotor arm assemblies includes a motor basket 57 and rotor blades 55. A set of shrouds 60 to protect the rotor arm assemblies 58 are also shown. The vehicle 50 also includes a set of snap-in landing gear parts 62.

FIG. 6a provides a cross-section of the rotor arm assembly 58 and corresponding socket 54 while FIG. 6b provides an expanded view of the section 6b of FIG. 6a. The rotor arm assembly 58 includes motor arm plastics 64, a motor 66, a printed circuit board 68 and wires which connect the motor 66 to the circuit board 68. The rotor arm 56 mates with the preferably hemispherical socket 54 in the vehicle 50 and preferably forms a joint which is hemispherical in shape as shown in FIGS. 6a and 6b. This shape allows the joint to separate in any direction away from the frame of the vehicle in the case of impact.

A printed circuit board 70 in the central pod 52 connects to circuitry inside the vehicle 50 and to the arm circuit board 68 using metal spring pin electrical contacts 72. These electrical contacts can carry both power and data signals to the rotor arm assemblies 58. In a preferred embodiment, an O-ring 74 is used between the rotor arm 56 and the socket 54 to provide an environmentally sealed connection and to reduce vibration of the arm 56 during use.

Retention of the arm 56 in the socket 54 is preferably achieved via spring loaded ball bearing plungers 76. These are mounted on the centre plane of the hemisphere so that the arms 56 are easily removable. The ball bearing mates with corresponding holes in the arm 56 to assist in alignment and retention. When the arm is manufactured from plastic, these holes are preferably reinforced by metal to avoid wear.

FIG. 7 provides an isometric view of the arm socket 54 on the frame of the vehicle. The socket 54 includes a socket body 78, a hemispherical socket 80, the circuit board and spring pins 82 and spring loaded ball bearings 84.

Control of the aerial vehicle 10 is preferably via a remote control, such as one of model airplanes. As will be understood, the remote control typically includes at least one joystick for controlling the direction of movement of the vehicle and a second control for controlling the height at which the vehicle hovers. These instructions are transmitted wirelessly between the remote control and the main processor 19 mounted to the central pod 12. Once these instructions are received by the main processor, further instructions are then transmitted to the individual rotor arm assemblies 14 in FIG. 1a, and 58 in FIG. 5, via the central pod rotor arm interface circuit board 40 to rotate the rotor blades 26 in the desired direction in response to the remote control instructions.

The vehicle 10 is powered by a rechargeable battery 85 (FIG. 5) which can be recharged in any number of ways. In one embodiment, the battery is mounted on the top of the frame 18. It is located outside of the frame 18 so that it is accessible to the user to replace and recharge, when necessary. In the preferred embodiment, the center of mass of the battery 85 should be located directly above the geometric center of the frame 18 to balance the load on each of the rotor arm assemblies 14.

In an alternative embodiment, the vehicle 10 includes a camera or other intelligence gathering payload 86, FIG. 5.

It will be understood that the systems and methods described herein may be embodied in a hardware implementation, mechanical enclosures or some combination thereof. It should also be understood that various modifications can be made to the example embodiments described and illustrated herein, without departing from the general scope of the inventions and associated claims.

What is claimed is:

1. A hovering unmanned aerial vehicle comprising:
   a central pod having an externally exposed frame and enclosing a main processor;
   a plurality of independent electrically driven rotors, each rotor rigidly mounted at a fixed distance from the center of the vehicle;
   a plurality of rotor arm assemblies removably secured to and extending from the frame, each rotor arm assembly including:
      an extending rotor arm;
      one of the independent electrically driven rotors; and
      electrical power and control infrastructure for the rotor; and
      conduits for passing electrical power, control signals and information from the pod to each of the rotor arm assemblies.

2. An aerial vehicle comprising:
   a central pod;
   a set of independent rotor arm assemblies, each rotor arm assembly having a first end connected to the central pod and a second end free of any connection;
   a set of mechanisms for connecting the connection end of each rotor arm assembly with the central pod enabling each rotor arm assembly to be independent and detached from the central pod; and
   a set of shrouds for protecting the rotor arm assemblies.

3. The aerial vehicle of claim 2 wherein the number of shrouds equals the number of rotor arm assemblies so that the set of shrouds protect each one of the set of independent rotor arm assemblies in a one-to-one relationship.

4. The aerial vehicle of claim 2 wherein the set of shrouds include at least two shrouds.

5. The aerial vehicle of claim 4 wherein each of the at least two shrouds includes shroud interconnect features for connecting the at least two shrouds together.

6. An aerial vehicle comprising:
   a central pod comprising a central pod frame and a set of receptacles;
   a set of independent rotor arm assemblies, each rotor arm assembly having a first end connected to the central pod and a second end free of any connection;
   a set of mechanisms for connecting the connection end of each rotor arm assembly with the central pod enabling each rotor arm assembly to be independent and detached from the central pod;
   wherein the set of receptacles are configured to receive the first end of each of the set of independent rotor arm assembles; and
   wherein each of the set of independent rotor arm assemblies comprises:
      a retainer ring for mating with one of the set of receptacles;
      a motor;
      a motor basket for housing the motor;
      a rotor arm, having the retainer ring located at the first end and connected to the motor basket at the second end; and
      a set of rotor blades connected to the motor;
      wherein the receptacle and the retainer ring form part of the mechanism.

7. The aerial vehicle of claim 6 wherein each of the set of independent rotor arm assemblies further comprises a support arm connecting the rotor arm assembly to a shroud.

8. The aerial vehicle of claim 2 further including apparatus for mounting the set of shrouds to the central pod.

9. The aerial vehicle of claim 8 wherein the apparatus for mounting the set of shrouds comprises:
   a female receiving portion located on the central pod; and
   a complementary male protrusion portion located on each of the set of shrouds.

10. The aerial vehicle of claim 1 further comprising a processor for communicating with a remote control to receive operational instructions.

11. The hovering unmanned aerial vehicle of claim 1 further comprising power, control signal and information infrastructure within the pod.

12. The hovering unmanned aerial vehicle of claim 11 wherein the power, control signal and information infrastructure is within the frame.

13. The hovering unmanned aerial vehicle of claim 1 wherein the plurality of rotor arm assemblies comprises 3 to 6 rotor arm assemblies.

14. The hovering unmanned aerial vehicle of claim 13 wherein the plurality of rotor arm assemblies comprises 4 rotor arm assemblies.

15. The hovering unmanned aerial vehicle of claim 14 wherein the 4 rotor arm assemblies are mounted to the central pod at evenly spaced intervals around the outside of the central pod.

16. The hovering unmanned aerial vehicle of claim 1 wherein the axis of each of the independent electrically driven rotors are substantially parallel.

17. The hovering unmanned aerial vehicle of claim 1 wherein the independent electrically driven rotors operate in substantially the same plane.

18. The hovering unmanned aerial vehicle of claim 1 wherein each of the independent electrically driven rotors provides a fixed axis of thrust.

19. The hovering unmanned aerial vehicle of claim 1 wherein
   each of the rotor arm assemblies includes:
      a connecting end connected to the central pod;
      a rotor end free of any connection; and
      a motor basket at the rotor end including an electric motor secured to the rotor; and
   the frame includes a set of attachment mechanisms at the central pod for connecting the connecting end of each of the rotor arm assemblies with the central pod enabling each of the rotor arm assemblies to be independent and detachable from the central pod.

20. The hovering unmanned aerial vehicle of claim 19 wherein the set of attachment mechanisms includes a respective set of receptacles.

21. The hovering unmanned aerial vehicle of claim 20 wherein each of the rotor arms includes a retainer ring for mating with a respective one of the set of receptacles and the receptacles and the retainer rings form part of the set of mechanisms.

22. The hovering unmanned aerial vehicle of claim 19 wherein the set of attachment mechanisms comprises a snap in mechanism for retaining the rotor arm assemblies in connection to the frame.

23. The hovering unmanned aerial vehicle of claim 19 wherein the set of attachment mechanisms comprises a set of sockets and the connecting end of each of the rotor arm assemblies includes ball plungers for mating with the set of sockets.

24. The hovering unmanned aerial vehicle of claim 23 wherein each socket of the set of sockets comprises a set of ball bearings for retaining and aligning an associated rotor arm assembly.

25. The hovering unmanned aerial vehicle of claim 1 further comprising a payload sensor for intelligence gathering.

26. The hovering unmanned aerial vehicle of claim 1 wherein the rotor arm assemblies are removably secured to the vehicle such that the rotor arm assemblies snap off the central pod in response to an outside force that would otherwise cause damage.

* * * * *